(12) United States Patent
Walther et al.

(10) Patent No.: US 7,741,408 B2
(45) Date of Patent: Jun. 22, 2010

(54) LOW GLOSS THERMOFORMABLE FLOORING STRUCTURE

(75) Inventors: Brian W. Walther, Lake Jackson, TX (US); Carl F. Baker, Lake Jackson, TX (US); Sharon L. Baker, Lake Jackson, TX (US); Michael D. Cassiday, Lake Jackson, TX (US); Charles F. Diehl, Lake Jackson, TX (US); Wenbin Liang, Sugar Land, TX (US); David P. Wright, Somerset, NJ (US)

(73) Assignee: Dow Global Technologies, Inc., Midland, MI (US)

( * ) Notice: Subject to any disclaimer, the term of this patent is extended or adjusted under 35 U.S.C. 154(b) by 0 days.

(21) Appl. No.: 10/548,751

(22) PCT Filed: Mar. 26, 2004

(86) PCT No.: PCT/US2004/009501

§ 371 (c)(1),
(2), (4) Date: Sep. 8, 2005

(87) PCT Pub. No.: WO2004/087804

PCT Pub. Date: Oct. 14, 2004

(65) Prior Publication Data

US 2006/0189759 A1    Aug. 24, 2006

Related U.S. Application Data

(60) Provisional application No. 60/458,517, filed on Mar. 28, 2003.

(51) Int. Cl.
*C08F 8/00*    (2006.01)
*C08L 23/00*    (2006.01)

(52) U.S. Cl. .................. 525/192; 525/191
(58) Field of Classification Search ............ 525/191, 525/192
See application file for complete search history.

(56) References Cited

U.S. PATENT DOCUMENTS

| | | | |
|---|---|---|---|
| 3,284,421 A | 11/1966 | Breslow | |
| 3,297,674 A | 1/1967 | Breslow et al. | |
| 3,645,992 A | 2/1972 | Elston | |
| 4,311,628 A | 1/1982 | Abdou-Sabet et al. | |
| 4,526,707 A | 7/1985 | Kutsuwa et al. | |
| 5,051,478 A | 9/1991 | Puydak et al. | |
| 5,206,294 A | 4/1993 | Dawson | |
| 5,266,627 A | 11/1993 | Meverden et al. | |
| 5,272,236 A | 12/1993 | Lai et al. | |
| 5,278,272 A | 1/1994 | Lai et al. | |
| 5,395,471 A | 3/1995 | Obijeski et al. | |
| 5,403,892 A | 4/1995 | Puydak et al. | |
| 5,562,958 A | 10/1996 | Walton et al. | |
| 5,639,818 A | 6/1997 | Lee et al. | |
| 5,703,187 A | 12/1997 | Timmers | |
| 5,721,185 A | 2/1998 | LaPointe et al. | |
| 5,856,406 A | 1/1999 | Silvis et al. | |
| 5,861,463 A | 1/1999 | Sehanobish et al. | |
| 5,863,665 A * | 1/1999 | Kale et al. | 428/523 |
| 5,869,591 A | 2/1999 | McKay et al. | |
| 5,872,201 A | 2/1999 | Cheung et al. | |
| 5,911,940 A | 6/1999 | Walton et al. | |
| 5,977,271 A | 11/1999 | McKay et al. | |
| 6,037,409 A | 3/2000 | Schmid et al. | |
| 6,048,909 A | 4/2000 | Chaudhary et al. | |
| 6,054,544 A | 4/2000 | Finlayson et al. | |
| 6,118,013 A | 9/2000 | Devore | |
| 6,124,370 A | 9/2000 | Walton et al. | |
| 6,153,680 A | 11/2000 | Shah et al. | |
| 6,191,245 B1 | 2/2001 | Campbell, Jr. et al. | |
| 6,231,795 B1 | 5/2001 | Chaudhary et al. | |
| 6,300,419 B1 | 10/2001 | Sehanobish et al. | |
| 6,355,410 B1 | 3/2002 | Rich | |
| 6,407,172 B1 | 6/2002 | Hausmann et al. | |
| 6,433,062 B1 | 8/2002 | Tasaka et al. | |
| 6,451,894 B1 | 9/2002 | Srinivasan et al. | |
| 6,506,842 B1 | 1/2003 | Heck et al. | |
| 6,548,600 B2 | 4/2003 | Walton | |
| 6,680,361 B1 | 1/2004 | Cady et al. | |
| 6,774,186 B2 | 8/2004 | Walton | |
| 6,803,415 B1 | 10/2004 | Mikielski et al. | |

(Continued)

FOREIGN PATENT DOCUMENTS

| | | | |
|---|---|---|---|
| EP | 0416815 | | 3/1991 |
| EP | 0765888 | | 4/1997 |
| EP | 0845498 | | 6/1998 |
| EP | 1153722 | | 11/2001 |
| WO | WO 98/32795 | * | 7/1998 |
| WO | WO-98/39385 A1 | | 9/1998 |
| WO | WO-99/31177 | | 6/1999 |
| WO | WO 01/02482 | * | 1/2001 |
| WO | WO-02/24803 A1 | | 3/2002 |

OTHER PUBLICATIONS

Propylene Polymers, Encyclopedia of Polymer Science and Technology, vol. 11, pp. 287 and 301-302.*

(Continued)

*Primary Examiner*—Milton I Cano
*Assistant Examiner*—Gennadiy Mesh

(57) ABSTRACT

A novel flooring composition was developed based on a blend comprising: a) an elastomer; b) a random propylene/alpha-olefin copolymer; c) a cross linking agent; and optionally d) a melt strength enhancing polymer. This composition achieves a unique balance of properties, exhibiting often-conflicting performance requirements. These include low gloss and excellent pattern duplication in embossing, low modulus, minimal odor, excellent grain acceptance and abrasion resistance, while remaining thermoformable and maintaining minimal shift in viscosity during recycle.

17 Claims, 2 Drawing Sheets

U.S. PATENT DOCUMENTS

| | | |
|---|---|---|
| 2001/0016620 A1 | 8/2001 | Itoh et al. |
| 2002/0113333 A1* | 8/2002 | Liu et al. .................... 264/83 |
| 2002/0115796 A1 | 8/2002 | Walton |
| 2004/0127628 A1 | 7/2004 | Walton et al. |
| 2005/0009942 A1 | 1/2005 | Walton |
| 2005/0176892 A1 | 8/2005 | Weaver et al. |
| 2005/0209403 A1 | 9/2005 | Walton et al. |
| 2007/0167575 A1 | 7/2007 | Weaver et al. |

OTHER PUBLICATIONS

T. R. Lettieri, E. Marx, J. -F. Song, and T. V. Vorburger, "Light scattering from glossy coatings on paper," Applied Optics, vol. 30, pp. 4439- (1991).

P. J. Caber, "Interferometric profiler for rough surfaces," Applied Optics, vol. 32, pp. 3438-(1993).

Whitehouse, D. J.; Bowen, D. K.; Venkatesh, V. C. ; Lonardo, P.; Brown, C. A.; "Gloss and Surface Topography"; Cirp Annals, vol. 43, pp. 541-549 (1994).

Magonov, S. N.; "Characterization of Polymer Surfaces with Atomic Force Microscopy"; Annual Review of Material Science, vol. 27, pp. 175-222; (1997).

Cogswell, F.N.; "Rheology and Structure", Polymer Melt Rheology, Woodhead Publishing; Ch 4, pp. 71-90 (1997).

Park, C. P., "Polyolefin Foams"; Polymer Foams and Foam Technology; D. Klempner et al Edition, 2nd Edition, Hanser Publishers, pp. 198- (1991).

* cited by examiner

Figure 1: Thermoforming and Position of Screen in Thermoforming test
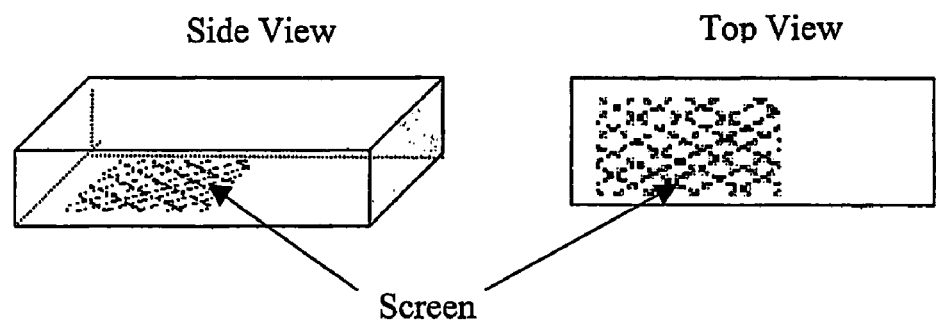

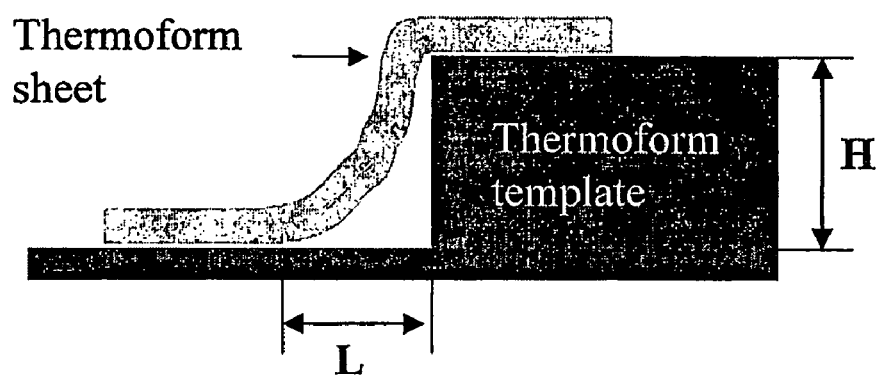
Figure 2. Schematic of Thermoform Embossability Index (EI) Measurement.

LOW GLOSS THERMOFORMABLE FLOORING STRUCTURE

The present application is 35 U.S.C. §371 National Stage of International Application No. PCT/U504/09501, filed on Mar. 26, 2004, which claims the benefit of U.S. Provisional Application No. 60/458,517, filed on Mar. 28, 2003.

Many polymer-processing methods involve the application of temperature and pressure to a resin formulation to fabricate a specific part. Examples of such processes include thermoforming, blow molding, injection molding and overmolding, calendaring, fiber forming, wire and cable, and extrusion coating. The parts resulting from these processes are often required to exhibit a variety of often-conflicting properties and thus industry is always looking for new formulations able to exhibit a desired combination of properties for a given processing method.

A variety of blend compositions have been formulated in an attempt to meet the requirements of the various molding processes. For instance, U.S. Pat. No. 5,639,818 describes a peroxide modified propylene homopolymer/polyethylene blend that exhibit superior extrusion coating properties, especially increased melt strength and reduced draw resonance behavior rendering them suitable for a wide variety of applications including thermoforming, blow molding as well as extrusion coating.

U.S. Pat. No. 6,433,062 B1 describes a process for the preparation of a thermoplastic elastomeric composition by melt kneading an organic peroxide with a mixture of a block copolymer (or hydrogenated block copolymer), a non-aromatic softening agent for rubber, an ethylene homopolymer or copolymer, and a propylene homopolymer or copolymer. The resulting composition exhibits improved heat deformation resistance, mechanical strength, moldability and processability.

U.S. Pat. No. 6,407,172 B1 describes a composition suitable for thermoforming, which demonstrates good grain retention and low cost. The composition comprises a mixture of a propylene homopolymer or copolymer, an ethylene-containing ionomer, a copolymer of ethylene and a glycidyl acrylate, polyethylene, optionally an uncrosslinked ethylene/propylene copolymer rubber, and optionally an ethylene alpha-olefin copolymer elastomer.

US Patent Application Publication No. 2001/0016620 A1 describes a crosslinked olefin thermoplastic composition comprising a crystalline polyolefin, an olefin-based copolymer rubber, and a paraffinic mineral oil softening agent which after molding results in articles with improved antifogging properties and high gloss.

U.S. Pat. No. 6,407,172 B1 describes thermoplastic polymer alloy composition comprising a blend of polypropylene, uncrosslinked ethylene copolymer, an ionomeric copolymer of ethylene and an α,β-unsaturated carboxylic acid, a crosslinking agent and a silicone elastomer. The compositions are said to be useful for forming interior skin sheets for applications where low gloss and high scuff resistance are desired.

U.S. Pat. No. 6,451,894 B1 describes molded articles made from thermoplastic blends of a crystalline or semi crystalline polyolefin and a multimodal elastomer of sequentially polymerized ethylene/alpha olefin monomers. Molded articles made from such blends exhibit increased paint adherence and improved resistance to fluid as well as higher weld line strength and low temperature ductility.

U.S. Pat. No. 6,506,842 B1 describes a rheology-modified thermoplastic elastomer composition. The composition is prepared by peroxide-modification of a melt blend of an ethylene/alpha-olefin copolymer or a diene-modified ethylene/alpha-olefin copolymer and a high melting point polymer such as a polypropylene or a propylene/alpha olefin. The composition is peroxide modified sufficient to result in an increase in solidification temperature (that is, the temperature of the highest temperature peak endotherm measured during cooling by differential scanning calorimeter (DSC)) that is at least 10° C. greater than that of the unmodified composition. These compositions have improved heat resistance and thus must be processed at higher temperatures.

Finally, US Patent Application Publication No. 2002/0115796 A1 describes thermoplastic elastomer compositions comprising a melt blend of an ethylene/alpha-olefin copolymer and a high melting point polymer such as a polypropylene or a propylene/alpha which is rheology modified using a combination of a peroxide and free radical coagents. The use of the coagent is said to increase the melt toughness and high temperature tensile properties as compared to the same compositions, which are rheology modified by peroxides alone.

Thermoforming is another of the family of processes that deal with the pressing or squeezing of pliable plastic into a final shape, and is the general term used for the process of making plastic parts from a flat sheet of plastic, through the application of pressure and temperature. However, thermoforming is differentiated from extrusion or blow molding, as in the former, the initial resin state is fluid rather than solid, whereas thermoforming always begins with a contiguous sheet of rubbery plastic. This sheet has been processed from resin pellets or powder by casting, calendaring, rolling, extruding, compression molding or other techniques. The thermoforming process is a result of four subsequent steps, namely; 1) heating the sheet, 2) stretching it; 3) cooling it on the mold surface; and 4) trimming the resulting part from its surroundings These deformation processes must occur while the polymer is in a rubbery solid state that is, above its glass transition temperature (Tg) but below its crystalline melting temperature (Tm) allowing easy uptake of the mold configuration. Thus the glass transition temperature, Tg, is the absolute lowest temperature at which the polymer can be formed. As processing temperatures increase above Tg, amorphous polymers become increasingly easier to process, but in crystalline polymers, the crystallite order restricts amorphous phase chain morphology, until the melting point is reached. Thus the normal thermoforming or "forming" temperature for an amorphous polymer is closely related to Tg, but for crystalline polymers the forming temperature is more dependent on the Tm. Typically, for single component amorphous materials, the lower forming temperature is about 20-30° C. above Tg, and the normal forming temperature is 70-100° C. above Tg. In contrast, the forming temperature range for crystalline polymers is quite narrow and the recommended forming temperature is often within a few degrees of the polymer Tm.

Once the plastic sheet is at the proper thermoforming temperature it can be stretched. The various thermoplastic sheet-forming techniques include, vacuum forming, pressure forming, matched mold forming, all of which require clamping, heating and shaping the sheet into or over a mold. Before forming, the heated sheet is virtually stress free. When properly formed, the sheet is almost completely stretched at the forming temperature before it is cooled against the mold. This results in a minimum of internal stress in the finished part.

In order to be readily formable, the heated sheet, when at forming temperature, must have certain physical properties including high melt strength, over a broad temperature range. The physical properties and melt strength of some thermoplastic polymers can be improved by the use of crosslinking agents, including peroxide and irradiation. A small amount of crosslinking serves to partially immobilize the polymer while above its traditional melting point by the introduction of a small amount of ultra high molecular weight material within the bulk polymer matrix resulting in an increase in the low shear viscosity and storage modulus. Thus, instead of becoming fluids above their melting points, lightly crosslinked thermoplastics remain soft thermoformable solids extending the range of the thermoforming temperature for such materials. However, too high a degree of crosslinking restricts the type of gross deformation required for successful thermoforming.

In addition to having the necessary strength requirements for molding the heated sheet, many applications require the resulting article to be embossed and also exhibit a specific gloss level. The degree of gloss can be regulated to some degree by the processing conditions such as extrudate or sheet temperature. Low gloss usually results from low extrudate or sheet temperature. In addition, while remaining relatively constant up to a certain thermoforming temperature, above this temperature, gloss begins to increase exponentially with further temperature increase. However, embossability increases much more linearly across the same temperature range.

The introduction of crosslinking in a polymer causes a decrease in the level of gloss of a finished part as a small amount of ultra high molecular weight material within the bulk polymer matrix causes distortions in the surface on cooling which in turn leads to a lower surface gloss. These distortions are due to the increased relaxation time of the ultra high molecular weight fraction relative to the bulk polymer matrix.

Flooring applications such as automotive flooring mats and liners have historically required the use of polymer compositions that exhibit both good thermoformability and excellent embossing pattern retention. Furthermore, such applications also generally require low surface gloss of the flooring for aesthetics and non-marking performance attributes. Recently, industry has developed the additional needs that such compositions also exhibit improved softer hand feel.

To date, typical polymer formulations used for such applications are made primarily of thermoplastic polyolefin (TPO) with polypropylene as the major component of the polymeric blend. Polypropylene is used as it has good abrasion resistance and thermal dimensional stability (that is, very important in automotive applications, which often require a high temperature dimensional stability and abrasion resistance). Flooring that is thermoformed from such compositions typically exhibit good thermoformability with excellent embossability. However, the flooring has relatively high stiffness.

Therefore it would be highly advantageous if new polymer compositions could be discovered which typically exhibit good thermoformability and excellent embossability and also exhibit low surface gloss for aesthetics and non-marking performance attributes.

The present invention relates to thermoplastic polymer compositions, articles made from such compositions, which exhibit the often-conflicting performance requirements of low gloss and excellent pattern duplication in embossing, while also exhibiting low modulus, minimal odor issues, excellent grain acceptance and abrasion resistance and maintained minimal shift in viscosity during recycle. While applicable to all molding and other processes requiring low gloss, the compositions of the present invention are especially suitable for thermoforming due to the range of processing temperatures used relative to the onset of high gloss. In addition, the ability to control gloss and embossability is especially important for thermoforming, which has no opportunity for additional process steps to reduce gloss other than polymer composition or temperature variation within the thermoforming window.

Novel flooring compositions have been developed based on a blend comprising; A) an elastomer; B) a random propylene/alpha-olefin copolymer; C) a cross linking agent; and optionally D) a melt strength enhancing polymer. This composition achieves a unique balance of properties. The final blend composition surprisingly exhibits the often-conflicting performance requirements of low gloss and excellent pattern duplication in embossing, while also exhibiting low modulus, minimal odor issues, excellent grain acceptance and abrasion resistance and maintained minimal shift in viscosity during recycle remaining thermoformable.

The cross linking agent generates a small amount of ultra high molecular weight material which increases its storage modulus and its low shear viscosity allowing the polymer to remain rubbery, at a given forming temperature. In addition the ultra high molecular weight material's increased relaxation time (relative to the bulk matrix) caused distortions in the polymer surface on cooling also leading to lower gloss.

Thus the incorporation lower melting point random propylene/alpha olefin copolymer in the blend compositions of the present invention lowers the overall melting point, which in turn allows the use of lower thermoforming temperatures, (that is, lower than that temperature at which the gloss begins to increase exponentially). This along with the incorporation of peroxide into these compositions, which also reduces gloss, allows the preparation of embossed parts, which exhibit low gloss and excellent embossability, as well as excellent physical properties, including good abrasion and heat resistance.

DESCRIPTION OF THE DRAWINGS

FIG. 1 shows position of a thermoform template, with regular raised cross sections of 0.87 mm height throughout the template, in the bottom of the flat female mold. The screen did not cover the entire area of the thermoformed part.

FIG. 2 shows how embossability can be expressed by thermoforming a sheet sample over an edge with 90° angle. The measurement of embossability uses the ratio of the height of the sheet at the mid point of the raised emboss pattern divided by the distance from this point to the location at which the sheet returns to the base.

DEFINITIONS

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time is from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The term "polymer" as used herein refers to a polymeric compound prepared by polymerizing monomers whether of the same or a different type. The generic term polymer thus embraces the term homopolymer, usually employed to refer to polymers prepared from only one type of monomer, and the term interpolymer as defined hereinafter.

The term "interpolymer" as used herein refers to polymers prepared by the polymerization of at least two different types of monomers. The generic term interpolymer thus includes copolymers, usually employed to refer to polymers prepared from two different monomers, and polymers prepared from more than two different types of monomers.

Statements herein that a polymer or interpolymer comprises or contains certain monomers, mean that such polymer or interpolymer comprises or contains polymerized therein units derived from such a monomer. For example, if a polymer is said to contain ethylene monomer, the polymer will have incorporated in it an ethylene derivative, that is, —CH$_2$—CH$_2$—.

The term "monomer residue" or "polymer units derived from such monomer" means that portion of the polymerizable monomer molecule, which resides in the polymer chain as a result of being polymerized with another polymerizable molecule to make the polymer chain.

Component A—Elastomer

The elastomers, which can be employed as Component A include, but are not, limited to homogeneously- or heterogeneously-branched ethylene/alpha olefin elastomers and plastomers.

The terms "heterogeneous" and "heterogeneously branched" are used in the conventional sense, and refer to a linear ethylene interpolymer where (1) the α-olefin comonomer is not randomly distributed within a given polymer molecule, (2) substantially all of the polymer molecules do not have the same ethylene-to-comonomer ratio, and (3) the interpolymer typically exhibits a measurable high density (crystalline) polymer fraction as measured by known fractionation techniques such as, for example, a method that involves polymer fractional elution as a function of temperature. Commercial examples of heterogeneously branched linear interpolymers include ATTANE* ULDPE polymers (a product and trademark of The Dow Chemical Company) and FLEXOMER™ VLDPE polymers (a product and trademark of Union Carbide Corporation, a Subsidiary of The Dow Chemical Company).

The terms "homogeneous" and "homogeneously-branched" means that in an ethylene/α-olefin interpolymer (1) the α-olefin comonomer is randomly distributed within a given polymer molecule, (2) substantially all of the polymer molecules have the same ethylene-to-comonomer ratio, and (3) the interpolymer essentially lacks a measurable high density (crystalline) polymer fraction as measured by known fractionation techniques such as, for example, a method that involves polymer fractional elution as a function of temperature.

The homogeneously branched ethylene interpolymers that can be used in the practice of this invention include linear ethylene interpolymers, and substantially linear ethylene interpolymers.

Included amongst the homogeneously branched linear ethylene interpolymers useful as elastomers in the compositions of the present invention are ethylene polymers which do not have long chain branching, but do have short chain branches derived from the comonomer polymerized into the interpolymer which are homogeneously distributed both within the same polymer chain and between different polymer chains. That is, homogeneously branched linear ethylene interpolymers have an absence of long chain branching just as is the case for the linear low density polyethylene polymers or linear high density polyethylene polymers made using uniform branching distribution polymerization processes as described, for example, by Elston in U.S. Pat. No. 3,645,992. Commercial examples of homogeneously branched linear ethylene/α-olefin interpolymers include TAFMER™ polymers supplied by the Mitsui Chemical Company and EXACT™ polymers supplied by Exxon Chemical Company.

The substantially linear ethylene interpolymers used in the present invention are described in U.S. Pat. Nos. 5,272,236 and 5,278,272, 6,054,544 and 6,335,410 B1, the entire contents of all of which are herein incorporated by reference. The substantially linear ethylene interpolymers useful as elastomers in the compositions of the present invention are those in which the comonomer is randomly distributed within a given interpolymer molecule and in which substantially all of the interpolymer molecules have the same ethylene/comonomer ratio within that interpolymer. Substantially linear ethylene interpolymers are homogeneously branched ethylene polymers having long chain branching. The long chain branches have the same comonomer distribution as the polymer backbone and can have about the same length as the length of the polymer backbone. "Substantially linear" means that the bulk polymer is substituted, on average, with 0.01 long chain branches/1000 total carbons (including both backbone and branch carbons) to 3 long chain branches/1000 total carbons. Preferred polymers are substituted with 0.01 long chain branches/1000 total carbons to 1 long chain branch/1000 total carbons, more preferably from 0.05 long chain branches/1000 total carbons to 1 long chain branch/1000 total carbons, and especially from 0.3 long chain branches/1000 total carbons to 1 long chain branch/1000 total carbons. Commercial examples of substantially linear polymers include the ENGAGE™ polymers (available from DuPont Dow Elastomers L.L.C.), and AFFINITY™ polymers (available from The Dow Chemical Company).

Suitable unsaturated comonomers useful for polymerizing with ethylene to prepare suitable heterogeneously- or homogeneously-branched linear ethylene interpolymers include, for example, ethylenically unsaturated monomers, conjugated or nonconjugated dienes, polyenes, etc. Examples of such comonomers include the $C_3$-$C_{20}$ α-olefins such as propylene, isobutylene, 1-butene, 1-hexene, 4-methyl-1-pentene, 1-heptene, 1-octene, 1-nonene, 1-decene, and the like. Preferred comonomers include propylene, 1-butene, 1-hexene, 4-methyl-1-pentene and 1-octene, with octene-1 being especially preferred. Other suitable monomers include styrene, halo-or-alkyl-substituted styrenes, tetrafluoroethylenes, vinylbenzocyclobutanes, butadienes, isoprenes, pentadienes, hexadienes, octadienes and cycloalkenes, for example, cyclopentene, cyclohexene and cyclooctene. Typically and preferably, the heterogeneously- or homogeneously-branched linear ethylene interpolymer is a copolymer in which ethylene is copolymerized with one $C_3$-$C_{20}$ α-olefin. Most preferably, the heterogeneously- or homogeneously-branched linear ethylene interpolymer is a copolymer of ethylene and 1-octene or a copolymer of ethylene and 1-butene.

Also included as elastomer component of the compositions of the present invention are the substantially random interpolymers comprising polymer units derived from one or more α-olefin monomers with one or more vinyl or vinylidene aromatic monomers and/or a hindered aliphatic or cycloaliphatic vinyl or vinylidene monomers). The substantially random interpolymers include the pseudo-random interpolymers as described in EP-A-0,416,815 and EP-A-0,765,888 by James C. Stevens et al. and U.S. Pat. No. 5,703,187 by Francis J. Timmers. The substantially random interpolymers also include the substantially random terpolymers as described in U.S. Pat. No. 5,872,201. Also suitable are the substantially random interpolymers, which comprise at least one α-olefin/vinyl aromatic/vinyl aromatic/α-olefin tetrad disclosed in U.S. Pat. No. 6,191,245 B1.

The substantially random interpolymers can be prepared by polymerizing a mixture of polymerizable monomers in the presence of one or more metallocene or constrained geometry catalysts in combination with various cocatalysts. Preferred operating conditions for the polymerization reactions are pressures from atmospheric up to 3000 atmospheres and temperatures from −30° C. to 200° C. Examples of processes used to prepare the substantially random interpolymers are described in U.S. Pat. Nos. 6,048,909 and 6,231,795 B1.

Examples of suitable catalysts and methods for preparing the substantially random interpolymers are disclosed in EP-A-0,416,815; EP-A-514,828 (U.S. Pat. No. 6,118,013); EP-A-520,732 (U.S. Pat. No. 5,721,185); as well as U.S. Pat. Nos. 5,055,438; 5,057,475; 5,096,867; 5,064,802; 5,132,380; 5,189,192; 5,321,106; 5,347,024; 5,350,723; 5,374,696; and 5,399,635; 5,470,993; 5,866,704; 5,959,047; 6,150,297; and 6,015,868.

Also included as the elastomer component of the compositions of the present invention are ethylene vinyl acetate (EVA), ethylene ethyl acrylate (EEA), and ethylene/acrylic acid (EAA) copolymers, rubbers such as polyisoprene, ethylene/octene, polybutadiene, natural rubbers, ethylene/propylene and propylene/ethylene rubbers, ethylene/propylene diene (EPDM) rubbers, silicone rubbers, styrene/butadiene rubbers and thermoplastic polyurethanes. The elastomer can also be a styrenic block copolymer such SBS, SIS, SEBS, CPE, buna rubber, and nitriles.

More preferred elastomers as Component A of the present invention are the ethylene/alpha olefin and ethylene/vinyl aromatic monomer interpolymers, with the ethylene/butene, and ethylene/octene heterogeneously- or homogeneously-branched linear ethylene interpolymers and ethylene/styrene substantially random interpolymers being the most preferred.

Component B—Random Propylene/Alpha-Olefin Copolymer

Component B is a random propylene/alpha-olefin copolymer. Preferred are propylene/$C_2$-$C_{20}$ alpha olefin copolymers, Examples of such $C_2$-$C_{20}$ α-olefins (excluding propylene) include 1-butene, 1-hexene, 4-methyl-1-pentene, 1-heptene, 1-octene, 1-nonene, 1-decene, and the like. Preferred comonomers include ethylene, 1-butene, 1-hexene, 4-methyl-1-pentene and 1-octene, with random propylene/ethylene, propylene/butene, propylene/hexene and propylene/octene copolymers being more preferred and random propylene/ethylene copolymers being most preferred. The random propylene/alpha olefin copolymer may also be used as a blend with homopolymer polypropylene in the formulations of the present invention. If used as a blend with propylene homopolymer the random propylene/alpha olefin copolymer component must be present in said blend in an amount greater than 50, preferably greater than 60, more preferably greater than 70 weight percent, (based on the combined weight of propylene homopolymer and copolymer).

Component C—Crosslinking Agent

Suitable crosslinking agents include peroxides, phenols, azides, aldehyde-amine reaction products, substituted ureas, substituted guanidines; substituted xanthates; substituted dithiocarbamates; sulfur-containing compounds, such as thiazoles, imidazoles, sulfenamides, thiuramidisulfides, paraquinonedioxime, dibenzoparaquinonedioxime, sulfur; silanes, ebeam radiation, and combinations thereof. See Encyclopedia of Chemical Technology, Vol. 17, 2nd edition, Interscience Publishers, 1968; also Organic Peroxides, Daniel Seem, Vol. 1, Wiley-Interscience, 1970).

Suitable peroxides include aromatic diacyl peroxides; aliphatic diacyl peroxides; dibasic acid peroxides; ketone peroxides; alkyl peroxyesters; alkyl hydroperoxides (for example, diacetylperoxide; dibenzoylperoxide; bis-2,4-dichlorobenzoyl peroxide; di-tert-butyl peroxide; dicumylperoxide; tert-butylperbenzoate; tert-butylcumylperoxide; 2,5-bis(t-butylperoxy)-2,5-dimethylhexane; 2,5-bis(t-butylperoxy)-2,5-dimethylhexyne-3; 4,4,4',4'-tetra-(t-butylperoxy)-2,2-dicyclohexylpropane; 1,4-bis-(t-butylperoxyisopropyl)-benzene; 1,1-bis-(t-butylperoxy>3,3,5-trimethylcyclohexane; lauroyl peroxide; succinic acid peroxide; cyclohexanone peroxide; t-butyl peracetate; butyl hydroperoxide; etc. It is also known to those skilled in the art that the choice of peroxide will also seek to minimize any odor in the resulting final part.

Suitable phenols are disclosed in U.S. Pat. No. 4,311,628. One example of a phenolic crosslinking agent is the condensation product of a halogen substituted phenol or a $C_1$-$C_{10}$ alkyl substituted phenol with an aldehyde in an alkaline medium, or by condensation of bifunctional phenoldialcohols. One such class of phenolic crosslinking agents is dimethylol phenols substituted in the para position with $C_5$-$C_{10}$ alkyl group(s). Also suitable are halogenated alkyl substituted phenol crosslinking agents, and crosslinking systems comprising methylol phenolic resin, a halogen donor, and a metal compound.

Suitable azides include azidoformates, such as tetramethylenebis(azidoformate) (see, also, U.S. Pat. No. 3,284,421, Breslow, Nov. 8, 1966); aromatic polyazides, such as 4,4'-diphenylmethane diazide (see, also, U.S. Pat. No. 3,297,674, Breslow et al., Jan. 10, 1967); and poly(sulfonyl azides) which are any compound having at least two sulfonyl azide groups (—$SO_2N_3$) reactive with the polymer or polymer blend. Preferably the poly(sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polymer or polymer blend and the sulfonyl azide, more preferably at least 1, more preferably at least 2, most preferably at least 3 carbon, oxygen or silicon, preferably carbon, atoms between functional groups. Preferred poly(sulfonyl azide)s include oxy-bis(4-sulfonylazidobenzene), 2,7-naphthalene bis(sulfonyl azido), 4,4'-bis(sulfonyl azido)biphenyl, 4,4'-diphenyl ether bis(sulfonyl azide) and bis(4-sulfonyl azidophenyl)methane, and mixtures thereof.

For crosslinking, the sulfonyl azide is admixed with the polymer or polymer blend and heated to at least the decomposition temperature of the sulfonyl azide, that is usually greater than 100° C. and most frequently greater than 150° C. The preferred temperature range depends on the nature of the azide that is used. For example, in the case of 4,4'-disulfonylazidediphenylether the preferred temperature range is greater than 150° C., preferably greater than 160° C., more preferably greater than 185° C., most preferably greater than 190° C. Preferably, the upper temperature is less than 250° C.

Suitable aldehyde-amine reaction products include formaldehyde-ammonia; formaldehyde-ethylchloride-ammonia; acetaldehyde-ammonia; formaldehyde-aniline; butyraldehyde-aniline; and heptaldehyde-aniline. Suitable substituted ureas include trimethylthiourea; diethylthiourea; dibutylthiourea; tripentylthiourea; 1,3-bis(2-benzothiazolylmercaptomethyl)urea; and N,N-diphenylthiourea. Suitable substituted guanidines include diphenylguanidine; di-o-tolylguanidine; diphenylguanidine phthalate; and the di-o-tolylguanidine salt of dicatechol borate. Suitable substituted xanthates include zinc ethylxanthate; sodium isopropylxanthate; butylxanthic disulfide; potassium isopropylxanthate; and zinc butylxanthate. Suitable dithiocarbamates include copper dimethyl-, zinc dimethyl-, tellurium diethyl-, cadmium dicyclohexyl-, lead dimethyl-, lead dimethyl-, selenium dibutyl-, zinc pentamethylene-, zinc didecyl-, and zinc isopropyloctyl-dithiocarbamate. Suitable thiazoles include 2-mercaptobenzothiazole, zinc mercaptothiazolyl mercaptide, 2-benzothiazolyl-N,N-diethylthiocarbamyl sulfide, and 2,2'-dithiobis(benzothiazole). Suitable imidazoles include 2-mercaptoimidazoline and 2-mercapto-4,4,6-trimethyldihydropyrimidine. Suitable sulfenamides include N-t-butyl-2-benzothiazole-, N-cyclohexylbenzothiazole-, N,N-diisopropylbenzothiazole-, N-(2,6-dimethylmorpholino)-2-benzothiazole-, and N,N-diethylbenzothiazole-sulfenamide. Suitable thiuramidisulfides include N,N'-diethyl-, tetrabutyl-, N,N'-diisopropyldioctyl-, tetramethyl-, N,N'-dicyclohexyl-, and N,N'-tetralauryl-thiuramidisulfide.

Those skilled in the art will be readily able to select amounts of crosslinking agent, with the amount selected taking into account characteristics of the polymer or polymer blend, such as molecular weight, molecular weight distribution, comonomer content, the presence of crosslinking enhancing coagents, additives (such as oil) etc. Typically, the amount of crosslinking agent employed will not exceed that which is required to effect the desired level of crosslinking.

Alternatively, silane crosslinking agents may be employed. In this regard, any silane that will effectively graft to and crosslink the polymer or polymer blends can be used in the practice of this invention. Suitable silanes include unsaturated silanes that comprise an ethylenically unsaturated hydrocarbyl group, such as a vinyl, allyl, isopropenyl, butenyl, cyclohexenyl or γ-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer. These silanes and their method of preparation are more fully described in U.S. Pat. No. 5,266,627 to Meverden, et al. Vinyl trimethoxy silane, vinyl triethoxy silane, γ-(meth)acryloxy propyl trimethoxy silane and mixtures of these silanes are the preferred silane crosslinkers for use in this invention.

The silane crosslinking agent is grafted to the polymer or polymer blend by any conventional method, typically in the presence of a free radical initiator for example peroxides and azo compounds, or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. A suitable azo compound is azobisisobutyl nitrite. Those skilled in the art will be readily able to select amounts of initiator employed, with the amount selected taking into account characteristics of the polymer or polymer blend, such as molecular weight, molecular weight distribution, comonomer content, as well as the presence of crosslinking enhancing coagents, additives (such as oil) etc. Typically, the amount of initiator employed will not exceed that which is required to effect the desired level of crosslinking, and is also employed in an amount so as to result in a reduction in 60° gloss at 150° C. by ASTM D523-89 (1999) Standard Test Method for Specular Gloss, (when compared to the same blend composition but absent the cross linking agent), of at least 50 percent, preferably at least 60 percent even more preferably by at least 65 percent, most preferably by at least 75 percent.

Silane crosslinking is promoted with a crosslinking catalyst, and any catalyst that will provide this function can be used in this invention. These catalysts generally include organic bases, carboxylic acids, and organometallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate; and tin carboxylate, especially dibutyltindilaurate and dioctyltimnaleate, are particularly effective for this invention. The catalyst (or mixture of catalysts) is present in a catalytic amount, typically between 0.015 and 0.035 weight percent combined weight of polymer or polymer blend, silane, initiator and catalyst.

While any conventional method can be used to graft the silane crosslinker to the polymer or polymer blend, one preferred method is blending the two with the initiator in the first stage of a reactor extruder, such as a Buss kneader. The grafting conditions can vary, but the melt temperatures are typically between 160° C. and 260° C., preferably between 190° C. and 230° C., depending upon the residence time and the half-life of the initiator.

Rather than employing a chemical crosslinking agent, crosslinking may be effected by use of radiation. Useful radiation types include electron beam or beta ray, gamma rays, X-rays, or neutron rays. Radiation is believed to effect crosslinking by generating polymer radicals, which may combine, and crosslink. Additional teachings concerning radiation crosslinking are seen in C. P. Park, "Polyolefin Foam" Chapter 9, Handbook of Polymer Foams and Technology, D. Klempner and K. C. Frisch, eds., Hanser Publishers, New York (1991), pages 198-204.

Radiation dosage depends upon the composition of the polymer or polymer blend. Those skilled in the art will be readily able to select suitable radiation levels, taking into account such variables as thickness and geometry of the article to be irradiated, as well as to characteristics of the polymer, such as molecular weight, molecular weight distribution, comonomer content, the presence of crosslinking enhancing coagents, additives (such as oil), etc.

For instance, in the case of crosslinking of 80 mil plaques by e-beam radiation, typical radiation dosages will be greater than 1 Mrad, preferably greater than 3 Mrad, more preferably greater than 5 Mrad. Electronic radiation dosages are referred to herein in terms of the radiation unit "RAD", with one million RADs or a megarad being designated as "Mrad". Typically, the dosage will not exceed that which is required to effect the desired level of crosslinking. For instance, dosages above 20 Mrad are not typically employed.

A full description of the various cross-linking technologies is described in U.S. Pat. Nos. 5,869,591 and 5,977,271, the entire contents of both of which are herein incorporated by reference.

In certain embodiments of the claimed invention, dual crosslinking systems, which use a combination of radiation, heat, moisture and crosslinking steps, may be effectively employed. For instance, it may be desirable to employ peroxide crosslinking agents in conjunction with silane crosslinking agents, peroxide crosslinking agents in conjunction with radiation, sulfur-containing crosslinking agents in conjunction with silane crosslinking agents, etc. Dual crosslinking systems are disclosed and claimed in U.S. Pat.

Nos. 5,911,940 and 6,124,370, the entire contents of both of which are herein incorporated by reference.

Component D—Melt Strength Enhancing Polymer

This component is optional and only typically used if the combination of A, B and C has insufficient melt strength for the application. Typically the melt strength required for thermoforming is dependent on a number of factors including the size, thickness and density of the part, the thermoforming temperature, the depth of the draw required for the mold, and any performance requirements in the target application. Thus one skilled in the art will make the choice of polymer melt strength enhancer based on the final melt strength required. Component D should have a melt strength of greater than 3 cN and can be, for example, low density polyethylene (LDPE), high density polyethylene (HDPE), polystyrene (PS), natural rubber, ethylene/propylene/diene monomer (EPDM), ultra high molecular weight polyethylene (UHMWPE), and blends of high and low density polyethylene (HDPE/LDPE blends). Most preferred is LDPE with melt strength greater than 3 cN.

Other Additives

Additives can also be included in either the individual blend components or added to the final blend. Such additives include antioxidants (for example, hindered phenols such as, for example, Irganox™ 1010, a registered trademark of Ciba Geigy), phosphites (for example, Irgafos™ 168, a registered trademark of Ciba Geigy), U.V. stabilizers, cling additives (for example, polyisobutylene), slip agents (such as erucamide and/or stearamide), antiblock additives, colorants, carbon black, pigments Also included as an additive are silicone polymers such as ultra high molecular weight polydimethylsiloxanes having a minimum molecular weight in the range of 60,000 to 1 million, which can be employed to improve abrasion resistance. These silicone polymers may be added directly but are preferentially added in the form of a masterbatch. Such siloxane masterbatches are typically dispersed in polymers, for example Dow Corning™ MB50-02, which is an ultra high molecular weight siloxane polymer, dispersed in low density polyethylene and available from Dow Corning.

Processing aids, which are also referred to herein as plasticizers, can also be included in either the individual blend components or added to the final blend, and include the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil (such as Kaydol™ oil (available from and a registered trademark of Witco), and Shellflex™ 371 naphthenic oil (available from and a registered trademark of Shell Oil Company). Another suitable oil is Tuflo™ oil (available from and a registered trademark of Lyondell).

Also included as a potential component of the polymer compositions used in the present invention are various organic and inorganic fillers, the identity of which depends upon the type of application for which the elastic film is to be utilized. The fillers can also be included in either the individual blend components or added to the final blend. Representative examples of such fillers include organic and inorganic fillers such as those made from asbestos, boron, graphite, ceramic, glass (for example, ground or flaked glass or hollow glass spheres or microspheres or beads, whiskers or filaments), metals (such as stainless steel, aluminum, bronze, nickel powder, lead or zinc) or polymers (such as aramid fibers) talc, carbon black, carbon fibers, carbonates such as barium, calcium or magnesium carbonate; alumina trihydrate, glass fibers, marble dust, cement dust, clay, feldspar, oxides such as aluminum, antimony, $B_2O_3$, magnesium or zinc oxide, or silicon (e.g silica or glass, fumed silica) or titanium dioxide; titanates, sulfates such as barium or calcium sulfate, aluminum nitride, or chalk, fluorides such as calcium or sodium aluminum fluoride; hydroxides such as aluminum hydroxide or magnesium hydroxide; silicates such as aluminum silicate, calcium silicate, asbestos, mica, clay (kaolin or calcined kaolin), feldspar, nepheline, perlite, pyrophyllite, talc or wollastonite; halogenated organic compunds used as flame retardants, metal sulfides; cellulose, in forms such as wood or shell flour; calcium terephthalate; and liquid crystals. Mixtures of more than one such filler may be used as well.

These additives are employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amount of antioxidants is usually in the range of from 0.01 to 10, preferably from 0.05 to 5, more preferably from 0.1 to 2 percent by weight based upon the weight of the polymer or polymer blend. Similarly, the amounts of any of the other enumerated additives are the functionally equivalent amounts such as the amount to render the polymer or polymer blend antiblocking, to produce the desired result, to provide the desired color from the colorant or pigment. Such additives can suitably be employed in the range of from 0.05 to 50, preferably from 0.1 to 35, more preferably from 0.2 to 20 percent by weight based upon the weight of the polymer or polymer blend.

The blend compositions of the present invention can be used in a variety of applications including thermoforming, blow molding, injection molding and overmolding, calendaring, fiber forming, wire and cable, and extrusion coating.

Properties of Blend Composition and Thermoformed Part

Blend Component A—The Elastomer

Component A is present in an amount of from 20 to 80, preferably of from 30 to 70, more preferably of from 35 to 65 wt percent (based on the combined weights of Components A, B, C, and D).

Most preferred is an ethylene/alpha olefin copolymer, which has a density of less than or equal to 0.915, preferably less than or equal to 0.905, most preferably less than or equal to 0.895 $g/cm^3$, or a substantially random ethylene/vinyl aromatic interpolymer (having a vinyl aromatic monomer content of less than or equal to 40, preferably less than or equal to 30, most preferably less than or equal to 20 mole percent).

Blend Component B—The Random Propylene/Alpha-Olefin Interpolymer

Component B is a random propylene/alpha-olefin interpolymer present in an amount of from 15 to 45, preferably of from 20 to 40, more preferably of from 20 to 35 wt percent (based on the combined weights of Components A, B, C, and D).

The random propylene/alpha olefin copolymer has an alpha olefin content sufficient to result in a polymer melting point (Tm) by Differential Scanning Calorimetry, DSC (as measured by ASTM D-3417) of less than 160, preferably less than 155, most preferably less than 150° C. In the case of a propylene/ethylene copolymer, the ethylene content is at least 1, preferably at least 2, most preferably at least 3 weight percent based on the weight of Component B.

Blend Component C—The Crosslinking Agent

Component C is a crosslinking agent, employed in an amount so as to result in a reduction in 60° gloss at 150° C. (as measured by ASTM D523-89, 1999) of at least 20 percent, preferably at least 30 percent even more preferably by at least 40 percent, most preferably by at least 50 percent, when compared to the same blend composition but absent the cross linking agent.

If the crosslinking agent to be used is a peroxide with a nominal active oxygen content of 10 percent, then it should be employed in an amount of from 200 to 6,000, preferably of from 400 to 5,000, more preferably of from 600 to 4,000 ppm (based on the final weight of the blend composition). Those skilled in the art would recognize that these amounts should be adjusted proportionally if the active oxygen content of the peroxide differs and/or its concentration differs such as if it is incorporated in an inert polymer, as in a masterbatch formulation.

Blend Component D—The Melt Strength Enhancing Polymer

Component D is present in an amount of from 0 to 40, preferably of from 15 to 35, more preferably from 20 to 35 wt percent (based on the combined weights of Components A, B, C, and D).

Final Blend Properties

The final blend composition should have a peak melting point (Tm) at a temperature of less than 160, preferably less than 155, most preferably less than 150° C. The lowest Tg peak should be less than −10, preferably less than −20, most preferably less than −30° C.

Final Thermoformed Part

The thermoformed article should thermoformable at a temperature of less than 180, preferably less than 170, most preferably less than 160° C.

The thermoformed article should have a gloss less than 10, more preferably less than 8, most preferably less than 6 when measured at 60° on textured part using ASTM D523-89 (1999) Standard Test Method for Specular Gloss).

The thermoformed article should have an Embossability Index of greater than 0.48, preferably greater than 0.50, more preferably greaten than 0.52.

EXAMPLES

Resins and Additives

The properties and description of the resins used in this study can be found in Table 1. The other components were listed in Table 2.

TABLE 1

Physical Characterization of Polymeric Components Used In This Study.

| Polymer | Density (g/cm$^3$) | Melt Flow Rate | Description |
|---|---|---|---|
| AFFINITY* 8100 | 0.870 | 1.00$^\#$ | Ethylene-octene copolymer, manufactured by and available from The Dow Chemical Company |
| H700-12 | 0.900 | 12.00$^+$ | Polypropylene homopolymer (Tm 164° C.), manufactured by and available from The Dow Chemical Company |
| 6D65L | 0.9000 | 4.00$^+$ | Random propylene/ethylene co-polymer (Tm 143° C.♦, 3.7 percent copolymer ethylene), manufactured by and available from The Dow Chemical Company |
| DS6D82 | 0.900 | 7.00$^+$ | Random propylene/ethylene co-polymer (Tm 134° C.♦, 5.7 percent copolymer ethylene, manufactured by and available from The Dow Chemical Company |
| LDPE 526A | 0.922 | 1.00$^\#$ | Low density polyethylene, manufactured by The Dow Chemical Company |

$^\#$Measured at 190° C./2.16 kg;
$^+$Measures at 230° C./2.16 kg;
*a trademark of The Dow Chemical Company
♦Tm measured by ASTM D-3417

TABLE 2

Characterization of Additional Components Used In This Study.

| Additive | Product form | Active percent by wt. | Description |
|---|---|---|---|
| Carbon black masterbatch | Pellet | 50 | Carbon black in polypropylene carrier available from Ampacet |
| Irganox B225 | Powder | 100 | 50/50 Blend of Irganox* 1010 and Irgaphos* 168. |
| Huber F325 CaCO$_3$ | Powder | 100 | Calcium carbonate filler available from Huber Corporation |
| Zinc stearate | Powder | 100 | Available from Aldrich Chemical Company. |
| Luperox 101PP20 | Powder | 20 | 20 percent active peroxide dispersed on polypropylene powder, 2.2 percent active oxygen. Available from Ato Fina. |

*A trademark of Ciba Giegy

Compounding

Compounding was done using a computer-controlled 40 mm, 34:1 L/D Werner-Pfliderer 50 horsepower twin screw extruder. The components were dry blended together and fed into the twin screw. The screw design provided moderate mixing and shear, ensuring homogeneous extrudate. The 7-zone extruder was starve-fed to produce 100 pounds per-hour at a melt temperature of approximately 215° C. The extruder profile was set at 185-195-200-200-205-205° C. The polymer exited the extruder through a single strand die and was quenched in a water bath and then pelletized. Typically, a total of 100 pounds of each blend was produced. The composition of the compounds was shown in Table 3.

TABLE 3

Composition of Blends Used In This Study$^\#$

| Polymers | Blend 1 | Blend 2 | Blend 3 | Blend 4 | Blend 5 | Blend 6 |
|---|---|---|---|---|---|---|
| H700-12 PP | 0.00 | 0.00 | 10.95 | 10.95 | 22.05 | 21.91 |
| 6D65L | 21.91 | 0.00 | 10.95 | 0.00 | 0.00 | 0.00 |
| DS6 D82 | 0.00 | 21.91 | 0.00 | 10.95 | 0.00 | 0.00 |

TABLE 3-continued

Composition of Blends Used In This Study#

| Polymers | Blend 1 | Blend 2 | Blend 3 | Blend 4 | Blend 5 | Blend 6 |
|---|---|---|---|---|---|---|
| AFFINITY* 8100 | 43.81 | 43.81 | 43.78 | 43.78 | 44.10 | 43.81 |
| LDPE 526A | 21.91 | 21.91 | 21.89 | 21.89 | 22.05 | 21.91 |
| Ingredient | 0.00 | 0.00 | 0.00 | 0.00 | 0.00 | 0.00 |
| CB/PP MB | 1.31 | 1.31 | 1.31 | 1.31 | 1.32 | 1.31 |
| Irgonox B225 | 0.26 | 0.26 | 0.26 | 0.26 | 0.26 | 0.26 |
| F325 CaCO3 | 9.94 | 9.94 | 9.99 | 9.99 | 10.00 | 9.94 |
| Zn Stearate | 0.22 | 0.22 | 0.22 | 0.22 | 0.22 | 0.22 |
| Luperox 101PP20 | 0.65 | 0.65 | 0.65 | 0.65 | 0.00 | 0.65 |
| (ppm Peroxide+) | (1300) | (1300) | (1300) | (1300) | (0) | (1300) |
| Total = | 100.00 | 100.00 | 100.00 | 100.00 | 100.00 | 100.00 |

All values were weight percent unless stated;
+Peroxide level corrected to undiluted concentration (Luperox 101PP20 was a 20 percent peroxide/polypropylene concentrate).

Thermoforming Evaluations and Gloss Measurements

The sheet to be thermoformed was made by extruding the pellets produced on the compound line through a computer-controlled 2 inch 30:1 L/D 5 zone Killion extruder through a 28-inch die gapped at 60 mils. The extruder screw speed was maintained at around 75 rpm. Extrudate melt temperature was approximately 168° C. The thickness of the sheet was maintained by varying the speed of the take away with a nominal thickness of 125 mils. The downstream equipment consisted of roll stack with three 12-inch diameter by 30-inch wide chrome plated rolls that fed into an air shear cutter made by Wysong.

Thermoforming was accomplished by using an AAA cut sheet thermoformer. This cut sheet thermoformer had ceramic heaters that heated the sheet of plastic after it was shuttled into the oven. Each sample was held in the oven, for varying times prior to thermoforming (between 60, 90, 100, 110, 120, 150 and 180 seconds) and the sample temperature was then obtained by constructing a calibration curve of time in the oven vs. sample sheet temperature. The longer the sample was held in the oven, the higher the temperature of the removed sheet. The measured sheet temperature was consistent between the various samples for a given length of time in the oven. After heating, the sheet was removed from the oven and immediately vacuum-formed into an air-cooled mold.

In order to evaluate gloss, and how well any emboss pattern was transferred to the sheet during thermoforming, a thermoform template with regular raised cross sections of 0.87 mm height throughout the template, was placed in the bottom of the flat female mold. Since the ability of the polymer sheet to thermoform was a function of the temperature of the sheet, for each thermoforming experiment the temperature of the samples was varied between a low value up to the point where the screen "stuck" to the film during the forming process. The screen did not cover the entire area of the thermoformed part, FIG. 1.

All gloss readings were obtained using ASTM D523-89 (1999) Standard Test Method for Specular Gloss using a Gardner BYK micro-TRI-gloss meter. Gloss was measured at 60° and the values reported represent the average of 4 readings. The gloss readings were obtained from areas where the screen hit the sample that was from the textured area. The gloss values from the textured area of a thermoformed sheet were measured as a function of the sample temperature at thermoforming. Table 4 summarizes the 60° gloss values of the textured area of the thermoformed sheet as a function of temperature.

TABLE 4

60° Gloss of Textured Area of Thermoformed Sheet as a Function of Temperature.

| Ex # | Blend Used | 60° Gloss At 115° C. | 60° Gloss At 148° C. | 60° Gloss At 152° C. | 60° Gloss At 159° C. | 60° Gloss At 172° C. | 60° Gloss At 184° C. |
|---|---|---|---|---|---|---|---|
| Ex 1 | Blend 1 | 1.6 | 2.5 | 2.9 | 3.3 | 7.9 | 9.8 |
| Ex 2 | Blend 2 | 1.9 | 2.2 | 2.1 | 2 | 6.6 | 11.2 |
| Ex 3 | Blend 3 | 1.8 | 2.4 | 2.7 | 2.9 | 3.3 | 10.1 |
| Ex 4 | Blend 4 | 2.0 | 2.2 | 2.3 | 2.2 | 5.9 | 12.7 |
| Comp Ex 1 | Blend 5 | 2.1 | 2.4 | 3 | 10.8 | 15.7 | 12.6 |
| Comp Ex 2 | Blend 6 | 1.7 | 1.6 | 2.4 | 3.7 | 8.8 | 9.6 |

Embossability Index

Thermoform embossability refers to the shape conformability of a thermoform sheet to a template after the thermoforming operation that is, the ability to reproduce the shape or pattern of a given template as reflected in the final thermoformed article. FIG. 2 shows how embossability can be expressed by thermoforming a sheet sample over a template with an edge with a 90° angle. The measurement of embossability index uses the ratio of the height of raised emboss pattern divided by the distance from which the slope of the emboss pattern varies from the perpendicular as shown in FIG. 2. The Embossability Index (EI) was a normalized scale, which can thus be used to designate the extent of the embossability of the thermoform sheet samples. It was expressed as Equation 1:

$$EI = 1 - \frac{1}{e^{H/L}}$$ (Equation 1)

Improved embossability results from maximizing the height (H) and minimizing the length (L). Thus the ratio of H/L increases as the sample approaches perfect pattern assimilation or reproduction of the emboss pattern. For example, a ratio of H to L that equals 0.5 would result in an EI value of 0.393. As the ratio of H/L increases to 1, the EI increases to a value of 0.638. Table 5 summarizes the embossability index as a function of temperature of thermoformed sheets made from blends used in this study, Acceptable Embossability Index values were defined as those with EI greater than 0.50.

TABLE 5

Embossability Index as a Function of Temperature of Thermoformed Sheets Made From Blends Used In This Study.

| Example # | Blend Used for Sheet | Temperature (C.) | Embossability Index* |
|---|---|---|---|
| Ex 5 | Blend 1 | 144 | 0.60 |
|  |  | 154 | 0.67 |
| Ex 6 | Blend 2 | 139 | 0.49 |
|  |  | 145 | 0.61 |
|  |  | 156 | 0.73 |
| Comp Ex 3 | Blend 5 | 144 | 0.39 |
|  |  | 157 | 0.42 |
| Comp Ex 4 | Blend 6 | 143 | 0.36 |
|  |  | 159 | 0.41 |

*Acceptable Embossability Index values were values greater than 0.48.

Analysis of the gloss levels in Table 4 for Comparative Example 1, which has no peroxide, shows a significant and sharp increase in gloss above 159° C. Although the gloss levels in Examples 1-4 also show a significant and sharp increase in gloss, this occurs at a higher temperature range that is, between 159 and 172° C.

Analysis of the Embossability Index data in Table 5, shows that for samples containing the random propylene/ethylene copolymer and peroxide (that is, Examples 5 and 6), the EI values were all acceptable (that is, >0.5) at thermoforming temperatures between 144-156° C. However, Comparative Example 4, the analogous blend, but where Component B was only homopolymer polypropylene instead of random polypropylene, acceptable EI values were not achieved even at temperatures as high as 159° C. Also, analysis of the EI data for Comparative Example 3, which contains the homopolymer polypropylene but no peroxide, shows that this composition still did not achieve acceptable EI values even at temperatures of 157° C. This was even though the absence of peroxide should improve the flow characteristics of the sheet and thus improve embossability.

Thus, the incorporation of random polypropylene into the compositions of the present invention increases their ability to be thermoformed at a temperature that was lower than that at which the gloss begins to increase exponentially. This reduction in temperature when coupled with the addition of peroxide into these compositions also reduces gloss, allowing the preparation of embossed parts, which exhibit both low gloss and excellent embossability. It should also be noted that when a blend of homopolymer polypropylene and random propylene/ethylene copolymer was used as Component B, a similar enhancement in both gloss and embossability was also observed.

The invention claimed is:

1. A polymer blend consisting of the following:
   A) an elastomer selected from a homogeneously- or a heterogeneously-branched ethylene/alpha-olefin interpolymer having a density of less than, or equal to, 0.905 g/cm$^3$;
   B) a random propylene/ethylene copolymer having a melting point (Tm) by Differential Scanning Calorimetry (as measured by ASTM D-3417) of less than 160° C.;
   C) from 200 ppm to 1300 ppm, based on the weight of the composition, of a peroxide crosslinking agent; and
   D) a melt strength enhancing polymer which is a is low density polyethylene (LDPE) with a melt strength of greater than 3 cN; and
   E) at least one additive selected from the group consisting of antioxidants, phosphites, U.V. stabilizers, cling additives, slip agents, antiblock additives, plasticizers, colorants, pigments, carbon black masterbatch, organic fillers, inorganic fillers, silicon polymer, and combinations thereof; and
   wherein the blend has an Embossability Index (EI) greater than 0.48, at thermoforming temperatures from 144° C. to 156° C., and
   wherein the blend does not contain a free radical coagent.

2. The blend of claim 1, wherein
   A) said elastomer, Component A, is present in an amount from 20 to 80 weight percent (based on the total weight of Components A, B, C, and D);
   B) said random propylene copolymer, Component B, is present in an amount from 15 to 45 weight percent (based on the total weight of Components A, B, C, and D), and has a melting point (Tm), as measured by ASTM D-3417, of less than 160° C.;
   C) said cross linking agent, Component C, is employed in an amount, so as to result in a reduction in 600 gloss at 150° C., by ASTM D523-89 (1999), of at least 20 percent, as compared to the same blend composition, but absent the cross linking agent, and
   D) said melt strength enhancing polymer, Component D, is present in an amount from 15 to 35 weight percent (based on the total weight of Components A, B, C, and D); and wherein
   E) said blend has a peak melting point, (Tm), as measured by Differential Scanning Calorimetry, DSC, using ASTM D-3417, of less than 165° C., and has a lowest Tg peak of less than −10° C.

3. The blend of claim 1, wherein
   A) said elastomer, Component A, is present in an amount from 30 to 70 weight percent (based on the total weight of Components A, B, C, and D);
   B) said random propylene copolymer, Component B, is present in an amount from 20 to 40 weight percent (based on the total weight of Components A, B, C, and D), and has a melting point (Tm), as measured by ASTM D-3417, of less than 155° C.;

C) said cross linking agent, Component C, is employed in an amount, so as to result in a reduction in 60° gloss at 150° C., by ASTM D523-89 (1999), of at least 30 percent, as compared to the same blend composition, but absent the cross linking agent; and D) said melt strength enhancing polymer, Component D is present in an amount from 15 to 35 weight percent (based on the total weight of Components A, B, C, and D); and wherein E) said blend has a peak melting point (Tm), as measured by Differential Scanning Calorimetry, DSC, using ASTM D-3417, of less than 160° C., and has a lowest Tg peak of less than −20° C.

4. The blend of claim 1, wherein

A) said elastomer, Component A, is present in an amount from 35 to 65 weight percent (based on the total weight of Components A, B, C, and D);

B) said random propylene copolymer, Component B, is present in an amount from 20 to 35 weight percent (based on the total weight of Components A, B, C, and D), and has a melting point (Tm), as measured by ASTM D-3417, of less than 150° C.;

C) said cross linking agent, Component C, is employed in an amount, so as to result in a reduction in 60° gloss at 150° C., by ASTM D523-89 (1999), when compared to the same blend composition, but absent the cross linking agent, of at least 40 percent; and D) said melt strength enhancing polymer, Component D is present in an amount from 20 to 35 weight percent (based on the total weight of Components A, B, C, and D); and wherein E) said blend has a peak melting point, (Tm), as measured by Differential Scanning Calorimetry, DSC, using ASTM D-3417, of less than 155° C., and has a lowest Tg peak of less than −30° C.

5. A polymer blend consisting of the following:

A) an elastomer selected from a homogeneously- or a heterogeneously-branched ethylene/alpha-olefin interpolymer having a density of less than, or equal to, 0.905 g/cm$^3$;

B) a mixture of polypropylene homopolymer and random propylene/ethylene copolymer having a melting point (Tm) by Differential Scanning Calorimetry (as measured by ASTM D-3417) of less than 160° C.;

C) from 200 ppm to 1300 ppm, based on the weight of the composition, of a peroxide crosslinking agent;

D) a melt strength enhancing polymer which is a is low density polyethylene (LDPE) with a melt strength of greater than 3 cN; and E) at least one additive selected from the group consisting of antioxidants, phosphites, U.V. stabilizers, cling additives, slip agents, antiblock additives, colorants, pigments, plasticizers, carbon black masterbatch, organic fillers, inorganic fillers, silicon polymer, and combinations thereof; and wherein the blend has an Embossability Index (EI) greater than 0.48, at thermoforming temperatures from 144° C. to 156° C., and wherein the blend does not contain a free radical coagent.

6. The polymer blend of claim 1 or claim 5, wherein the at least one additive is selected from the group consisting of a siloxane polymer, carbon black or inorganic filler, or a combination thereof.

7. A molded part comprising the blend of claim 1 or 5.

8. A thermoformed part comprising the blend of claim 1 or 5.

9. A wire and cable jacket comprising the blend of claim 1 or 5.

10. The part of claim 8, wherein the part is in the form of an automotive floor or floor mat.

11. A polymer blend consisting of

A) an elastomer selected from a homogeneously- or a heterogeneously-branched ethylene/alpha-olefin interpolymer having a density of less than, or equal to, 0.905 g/cm$^3$;

B) a random propylene/ethylene copolymer having a melting point (Tm), by Differential Scanning Calorimetry DSC (as measured by ASTM D3417), of less than 160° C.;

C) from 200 ppm to 1300 ppm, based on the weight of the composition, of a peroxide crosslinking agent;

D) at least one additive selected from the group consisting of antioxidants, phosphites, U.V. stabilizers, cling additives, slip agents, antiblock additives, colorants, pigments, plasticizers, carbon black masterbatch, organic fillers, inorganic fillers, silicon polymer, and combinations thereof; and optionally, E) a melt strength enhancing polymer which is a is low density polyethylene (LDPE) with a melt strength of greater than 3 cN; and wherein the blend has an Embossability Index (EI) greater than 0.48, at thermoforming temperatures from 144° C. to 156° C., and wherein the blend does not contain a free radical coagent.

12. An article comprising at least one component formed from the composition of claim 1.

13. An article comprising at least one component formed from the composition of claim 11.

14. A polymer blend consisting of the following:

A) an elastomer selected from a homogeneously- or a heterogeneously-branched ethylene/alpha-olefin interpolymer having a density of less than, or equal to, 0.905 g/cm$^3$;

B) a mixture of a polypropylene homopolymer and a random propylene/ethylene copolymer having a melting point (Tm), by Differential Scanning Calorimetry DSC (as measured by ASTM D3417), of less than 160° C.;

C) from 200 ppm to 1300 ppm, based on the weight of the composition, of a peroxide crosslinking agent;

D) at least one additive selected from the group consisting of antioxidants, phosphites, U.V. stabilizers, cling additives, slip agents, antiblock additives, colorants, pigments, plasticizers, carbon black masterbatch, organic fillers, inorganic fillers, silicon polymer, and combinations thereof; and optionally, E) a melt strength enhancing polymer which is a is low density polyethylene (LDPE) with a melt strength of greater than 3 cN; and wherein the blend has an Embossability Index (EI) greater than 0.48, at thermoforming temperatures from 144° C. to 156° C., and wherein the blend does not contain a free radical coagent.

15. The blend of claim 1, wherein the random propylene/ethylene copolymer has a melting point (Tm) by Differential Scanning Calorimetry (as measured by ASTM D-3417) of less than 150° C.

16. The composition as in claims 1, 5, 11 or 14, wherein the elastomer is a homogeneously branched ethylene/alpha-olefin interpolymer having a density of less than, or equal to, 0.905 g/cm$^3$.

17. The composition as in claims 1, 5, 11 or 14, wherein, for the elastomer, the alpha-olefin is selected from propylene, 1-butene, 1-hexene, 4-methyl-1-pentene or 1-octene.

* * * * *